United States Patent [19]
Lindsay et al.

[11] Patent Number: 5,805,448
[45] Date of Patent: Sep. 8, 1998

[54] HYBRID CONTROL SYSTEM FOR SCANNING PROBE MICROSCOPES

[75] Inventors: Stuart M. Lindsay; Tianwei Jing, both of Tempe, Ariz.

[73] Assignee: Molecular Imaging Corporation, Phoenix, Ariz.

[21] Appl. No.: 805,030

[22] Filed: Feb. 21, 1997

Related U.S. Application Data

[63] Continuation of Ser. No. 403,239, Mar. 10, 1995, abandoned.

[51] Int. Cl.⁶ .................. G01N 23/00; G06F 19/00
[52] U.S. Cl. .................. 364/176; 250/306; 250/307
[58] Field of Search .................. 364/148, 161, 364/180, 481, 483, 487, 550, 551.01, 571.01, 571.02, 176; 250/306, 307, 234; 310/311–317

[56] References Cited

U.S. PATENT DOCUMENTS

| | | | |
|---|---|---|---|
| Re. 34,331 | 8/1993 | Elings et al. | 250/306 |
| Re. 34,708 | 8/1994 | Hansma et al. | 250/306 |
| 4,823,004 | 4/1989 | Kaiser et al. | 250/306 |
| 4,837,435 | 6/1989 | Sukahara et al. | 250/306 |
| 4,889,988 | 12/1989 | Elings et al. | 250/306 |
| 4,954,704 | 9/1990 | Elings et al. | 250/307 |
| 4,969,978 | 11/1990 | Tomita et al. | 276/227 |
| 4,992,728 | 2/1991 | McCord et al. | 324/158 |
| 5,009,111 | 4/1991 | West et al. | 73/862.61 |
| 5,017,010 | 5/1991 | Mamin et al. | 356/345 |
| 5,018,865 | 5/1991 | Ferrel et al. | 356/376 |
| 5,051,646 | 9/1991 | Elings et al. | 310/317 |
| 5,066,858 | 11/1991 | Elings et al. | 250/307 |
| 5,077,473 | 12/1991 | Elings et al. | 250/306 |
| 5,081,390 | 1/1992 | Elings et al. | 310/328 |
| 5,107,113 | 4/1992 | Robinson | 250/306 |
| 5,120,959 | 6/1992 | Tomita | 250/306 |
| 5,202,004 | 4/1993 | Kwak et al. | 204/153.1 |
| 5,204,531 | 4/1993 | Elings et al. | 250/306 |

(List continued on next page.)

OTHER PUBLICATIONS

"Novel Stationary–Sample Atomic Force Microscope with Beam–Tracking Lens"; P.S. Jung and D.R. Yaniv; Feb. 4, 1993; Electronic Letters, vol. 29, No. 3, pp. 264–265.

"Control electronics for atomic force microscopy"; Marti, et al.; Review of Scientific Instruments, vol. 59, No. 6, Jun. 1988; pp. 836–839.

"Digital Control Systems"; Control System Compensation and Implementation with the TMS32010; Texas Instruments, Reprinted Jun. 1989, Exhibit C.

(List continued on next page.)

*Primary Examiner*—Joseph Ruggiero
*Attorney, Agent, or Firm*—Killworth, Gottman, Hagan & Schaeff L.L.P.

[57] ABSTRACT

A scanning probe microscope controller includes a digital signal processor (DSP) and an analog feedback control loop. The DSP serves to process the output of the scanning probe in the digital realm after conversion of the signal to digital form. After processing, the signal is restored to analog form. The height correction signal to be applied to a transducer controlling the distance between the scanning probe and a sample surface is then generated by an analog feedback control circuit, at least one parameter of which is under computer control. At the end of each scan-line, a variance may be calculated for the data and the inverse of this quantity is used to adjust the gain with which digitization of the data is carried out. Linearization of the data to correct for non-linearities in the scanning transducers may be carried out by the DSP after the data is acquired. This permits the scanning ramps applied to the transducers to be linear but the final displayed data do not show the effects of non-linearities. Adjustment of the feedback control loop gain may be carried out by monitoring the signal level from the scanning probe as each line is scanned. A computer determines if slow variations in this signal level have occurred across a line-scan. If so, the gain is increased. This process is continued until signals characteristic of excess gain (oscillation) are detected. At that point, the gain is reduced to a level slightly below the onset of the oscillation.

11 Claims, 9 Drawing Sheets

U.S. PATENT DOCUMENTS

| | | | |
|---|---|---|---|
| 5,210,410 | 5/1993 | Barrett | 250/234 |
| 5,224,376 | 7/1993 | Elings et al. | 73/105 |
| 5,229,606 | 7/1993 | Elings et al. | 250/306 |
| 5,231,286 | 7/1993 | Kajimura et al. | 250/234 |
| 5,237,859 | 8/1993 | Elings et al. | 73/105 |
| 5,253,516 | 10/1993 | Elings et al. | 73/105 |
| 5,262,643 | 11/1993 | Hammond et al. | 250/306 |
| 5,266,801 | 11/1993 | Elings et al. | 250/306 |
| 5,266,896 | 11/1993 | Rugar et al. | 324/307 |
| 5,266,897 | 11/1993 | Watanuki et al. | 324/244 |
| 5,267,471 | 12/1993 | Abraham et al. | 73/105 |
| 5,280,341 | 1/1994 | Nonnenmacher | 356/358 |
| 5,283,442 | 2/1994 | Martin et al. | 250/561 |
| 5,286,004 | 2/1994 | Okada et al. | 250/306 |
| 5,293,042 | 3/1994 | Miyamoto et al. | 250/306 |
| 5,304,924 | 4/1994 | Yamano et al. | 324/158 |
| 5,308,974 | 5/1994 | Elings et al. | 250/234 |
| 5,321,977 | 6/1994 | Clabes et al. | 73/105 |
| 5,323,003 | 6/1994 | Shido et al. | 250/306 |
| 5,329,122 | 7/1994 | Sakai et al. | 250/306 |
| 5,329,515 | 7/1994 | Kawgishi et al. | 369/126 |
| 5,329,808 | 7/1994 | Elings et al. | 73/105 |
| 5,331,589 | 7/1994 | Gambino et al. | 365/151 |
| 5,336,369 | 8/1994 | Kado et al. | 156/659 |
| 5,336,887 | 8/1994 | Yagi et al. | 250/306 |
| 5,345,815 | 9/1994 | Albrecht et al. | 73/105 |
| 5,345,816 | 9/1994 | Clabes et al. | 73/105 |
| 5,347,854 | 9/1994 | Martin et al. | 73/105 |
| 5,357,105 | 10/1994 | Harp et al. | 250/234 |
| 5,371,727 | 12/1994 | Shido et al. | 250/307 |
| 5,381,101 | 1/1995 | Bloom et al. | 324/676 |
| 5,388,452 | 2/1995 | Harp et al. | 73/105 |
| 5,438,206 | 8/1995 | Yokoyama et al. | 250/424.11 |
| 5,481,521 | 1/1996 | Washizawa et al. | 369/99 |
| 5,497,000 | 3/1996 | Tao et al. | 250/307 |

OTHER PUBLICATIONS

"Chemical Applications of Scanning Tunneling Microscopy"; West, et al.; IBM Journal of Research Development, vol. 30, No. 5, Sep. 1986, pp. 484–490.

"Candidacy Report; Kramer John Adam", May 21, 1985; pp. 1–48.

"Atomic Force Microscope–Force Mapping and Profiling on a sub 100–A Scale"; Martin, et al.; Journal of Applied Physics, 61(10) May 15, 1987, American Institute of Physics, pp. 4723–4729.

"Implementation of Digital Controllers—A Survey"; Hanselmann, Automation, vol. 23, No. 1, pp. 7–32 1987.

"Atomic Force Microscope"; Hansma, et al.Journal of Applied Physics, 76 (2) Jul. 15, 1994, American Institute of Physics, pp. 796–799.

Putman, et al., "Viscoelasticity of living cells allows high–resolution imaging by taping mode atomic force micrscopy", Department of Applied Physics, University of Twente, Jan. 4, 1994.

HYBRID CONTROL SYSTEM FOR SCANNING PROBE MICROSCOPES

CROSS-REFERENCE TO RELATED APPLICATION

This is a file-wrapper continuation of patent application Ser. No. 08/403,239, filed Mar. 10, 1995, abandoned.

BACKGROUND OF THE INVENTION

1. Field of the Invention

This invention relates to control systems used for operating a scanning probe microscope such as a scanning tunneling or an atomic force microscope.

2. The Prior Art

Scanning probe microscopes operate by positioning a sensing tip in close proximity to a surface and sensing a signal that is characteristic of the distance between the sensing tip and the surface. In the case of the scanning tunneling microscope (STM) the signal is the tunnel current that can flow between two conducting surfaces. In the case of the atomic force microscope (AFM), the signal is the deflection of the probe caused by the interaction forces between the probe and the surface. In all cases, the microscopes operate by moving the sensing tip over the surface in a raster or similar scan, controlling the height of the tip so as to keep the measured signal constant. A display of the adjustment signal used to keep the measured signal constant constitutes a "map" of the topography of the surface being scanned.

The original scanning probe microscopes were based on analog control of the signal using a conventional PID (proportional, integral and differential) feedback control circuit. A significant simplification is realized when such a control system is implemented in a digital fashion, as described in U.S. Pat. No. Re. 34,331. Such a system 10 is illustrated schematically in FIG. 1. The sensing tip 12 is held near enough to a surface 14 so that a signal responsive to the interaction between tip 12 and surface 14 is generated. This signal is fed to an analog to digital (ADC) converter 16 where it is turned into a stream of binary numbers on line 18. A computer 20 then calculates the desired correction signal using well-known methods to implement PID control. The resulting stream of binary data on line 22 is turned back to an analog signal by a digital to analog converter (DAC) 24 and the resultant analog voltage signal is applied to transducer 26 that controls the height of tip 12 above sample surface 14.

All-digital controllers of this sort are not always to be preferred. An analog system can be intrinsically faster and need not suffer from the round off errors associated with the approximations used in the computer implementation of PID control. However, it can be extremely cumbersome to operate an all analog system. A digital computer is generally needed to display the final image in any case, so it is natural to incorporate the controls for the microscope into a computer display. One method for doing this has long been used in, for example, instruments sold by Angstrom Technology of Mesa, Ariz. This scheme employs a digital computer to control an analog feedback system 28 as illustrated in FIG. 2. The signal from tip 30 interacting with a sample surface 32 is sent to an analog PI (proportional-integral) controller 34 (differential gain is not often used in this context). Controller 34 includes a differential amplifier 36 that generates a signal proportional to the difference between the sensor signal on line 38 and a set-point signal on line 40. The set-point signal on line 40 is generated via computer 42 using a digital to analog converter (DAC) 44. The difference signal at node 46 is fed to a stage of proportional gain (proportional amplifier) 48 and an integrator 50. The gains of both of these elements 48, 50 are also set by digital to analog converters (DACs) 52 and 54, respectively, operating under the control of computer 42 as programmable gain devices. The outputs of integrator 50 and proportional amplifier 48 are then summed in a summing junction 56 to generate a correction signal on line 58 that is applied to transducer 60 that controls the height of the tip 30.

A drawback of this arrangement is that every change in configuration requires extra circuitry. For example, if the input is from an STM (where the current varies exponentially with distance) then it is normal to take the logarithm of the input signal to linearize the response of the system. In other cases, the polarity of a driving transducer may be changed so that the overall sign of the gain of the control loop must be changed. In yet other cases, it is desirable to interrupt servo control of the tip in order to gather data while the tip remains in a fixed position. For example, in an STM, one might disable the servo and collect the value of current as the tip voltage is swept over a certain range. An analog system that catered to all these possibilities would be very cumbersome.

Yet another problem arises when a signal is digitized using a fixed level of gain. If the surface being scanned is very rough, then the variations in signal level may be large, so any circuit set up to make analog to digital conversion must be capable of detecting the largest changes. If the same gain setting is used when a very flat surface is scanned, then noise due to the finite digitization levels becomes a problem. For example, if the maximum range of movement in the z direction is 10 microns, then, with 16 bit digitization, the physical distance corresponding to one bit is 1.5 Å which is completely unacceptable for atomic resolution images.

Another problem arises in the sweeping of the tip across the surface. The piezoelectric elements used to generate this sweep are intrinsically nonlinear in their response. Thus, a map of topography that is made by advancing the display position linearly with respect to the scanning voltage is distorted. U.S. Pat. No. 5,051,646 describes a method whereby the voltage applied to the tip is generated as a waveform calculated so as to give a linear scan. That is to say, the waveforms applied to the transducers that move the tip in the plane (x-y plane) of the sample surface are not simple ramps (voltages that increase linearly with time). They compensate for the non-linearity of the transducers by, for example, increasing more rapidly in regions where the transducer is less responsive. This is achieved by generating the waveform according to a polynomial in which coefficients are chosen so as to achieve a linear scan with the transducer being used.

This approach suffers from the drawback that linear scanning ramps are sometimes required to drive auxiliary controls. For example, it may be desirable to drive a second control circuit that pulses the tip at certain locations in order to draw features on the surface being scanned. For this reason, it is desirable to have a linear scanning signal, and yet still be able to compensate for non-linearities in the scanning transducers.

Yet another problem arises in the way in which the gain of the feedback loop is adjusted. In all systems used to date, the overall gain of the feedback loop is a parameter entered by the operator from a computer keyboard. However, the overall gain of the feedback loop depends upon the sample surface. This is because one component of the conversion is the action of the tip itself: the number of volts that are generated by each angstrom the tip moves towards or away from the surface. On a dirty surface, the tip transducer may have to move a long way to compress dirt between the tip and the surface so as to achieve a desired change in gap. The consequence of this is that the gain required for optimal operation varies considerably from point to point over a given surface and from sample to sample for a given microscope. The gain in prior art controllers is therefore rarely optimally adjusted, since it must be constantly corrected by the operator.

OBJECTS AND ADVANTAGES OF THE INVENTION

Accordingly, it is an object of the present invention to provide a controller for scanning probe microscopes that combines the speed and simplicity of an analog control system with the flexibility of a digital system.

It is a further object of the present invention to provide a method for digitization that is automatically adjusted to take account of the overall variations in the height of the sample.

It is a further object of the present invention to provide a system for correction of non-linearities in scanning transducers that does not rely on generating special waveforms for the scanning transducers but permits linear voltage ramps to be used to control the scanning transducers.

It is yet another object of the present invention to provide a control system in which the gain of the servo loop is continuously optimized without the intervention of an operator.

These and many other objects and advantages of the present invention will become apparent to those of ordinary skill in the art from a consideration of the drawings and ensuing description of the invention.

SUMMARY OF THE INVENTION

The foregoing objects have been achieved in the present invention. According to a first aspect of the present invention, the controller includes two separate sections: one is a digital signal preconditioner (or processor); the other is an analog control loop. The digital signal preconditioner serves to process the output of the sensing element in the desired manner in the digital realm after conversion of the signal to digital form. After preprocessing to carry out operations other than calculation of the height correction, the signal is restored to analog form. The height correction signal is then generated by an analog circuit, at least one parameter of which is under computer control. Implementation of steps such as calculation of a logarithm, changing of the overall signal level and phase and 'freezing' of the servo output are all easily achieved using digital techniques while retaining the benefits of analog processing. The height correction signal is calculated by analog circuitry.

According to a second aspect of the present invention, at the end of each scan-line, a variance is calculated for the data and the inverse of this quantity is used to adjust the gain with which digitization of the data is carried out. In this way, noise due to digitization is eliminated from atomic resolution images.

According to a third aspect of the present invention, linearization of the data to correct for non-linearities in the scanning transducers is carried out by the digital signal processor after the data is acquired. Thus, the scanning ramps applied to the transducers may be linear (i.e., a voltage that rises constantly with time) but the final displayed data do not show the effects of non-linearities in the scan.

According to a fourth aspect of the present invention, adjustment of the servo-loop gain is carried out by monitoring the signal level from the tip sensor as each line is scanned. This is the signal that the servo will keep constant when operating properly. A computer determines whether or not slow variations in this signal level have occurred across a line-scan. If they have, the gain is increased. This process is continued until signals characteristic of excess gain (oscillation) are detected. At that point, the gain is reduced to a level slightly below the onset of the oscillation.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
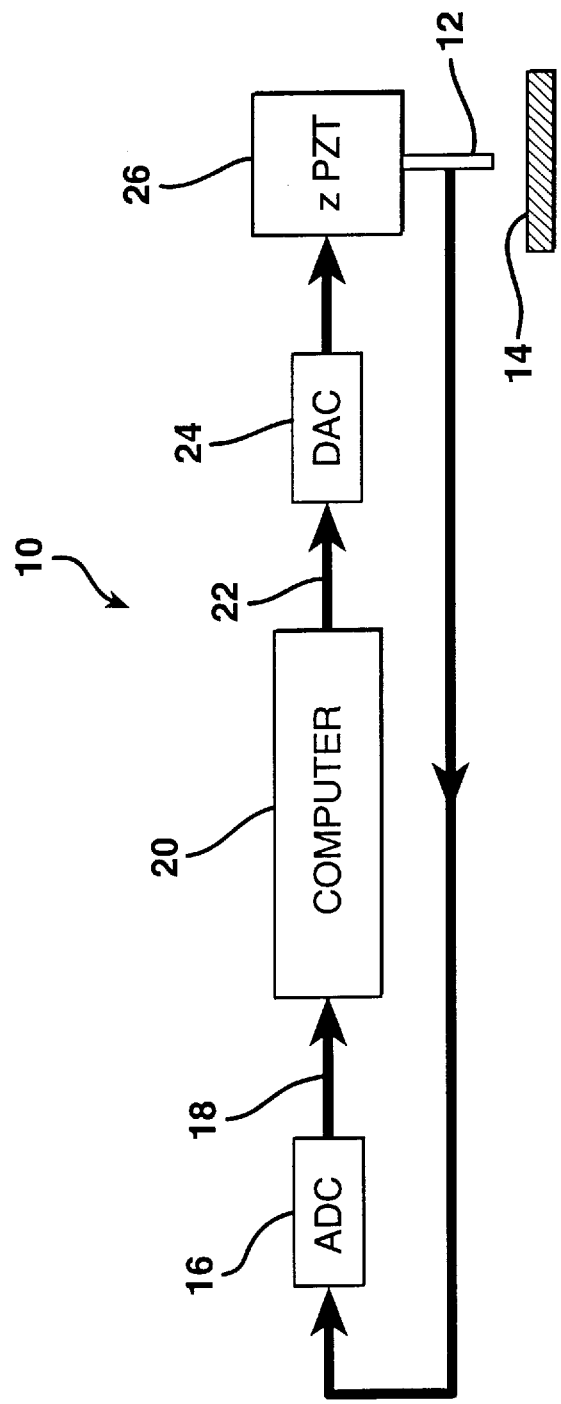
FIG. 1 is a schematic diagram of an all-digital controller according to the prior art.
Figure 2:
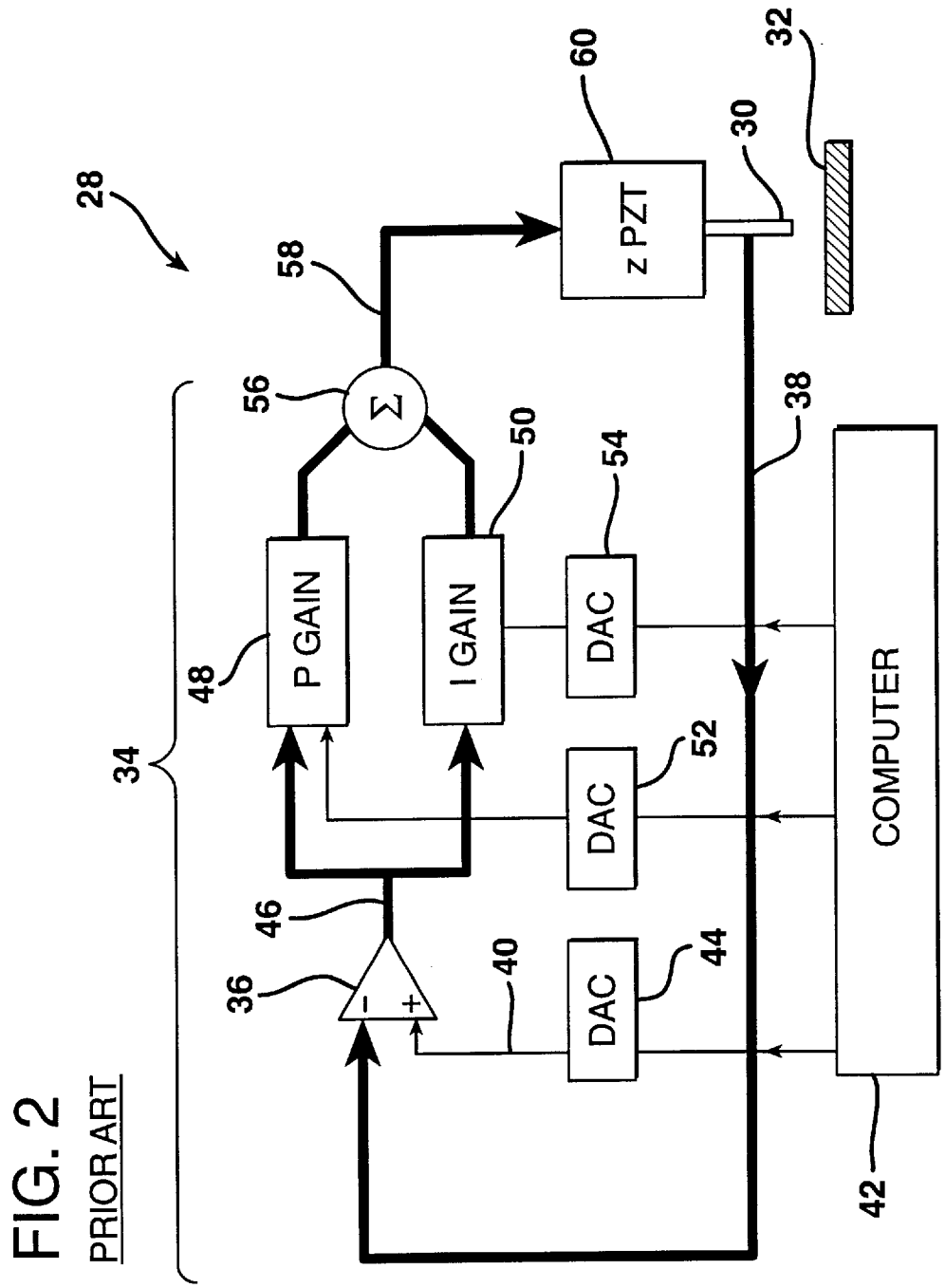
FIG. 2 is a schematic diagram of an analog controller under computer control according to the prior art.
Figure 3:
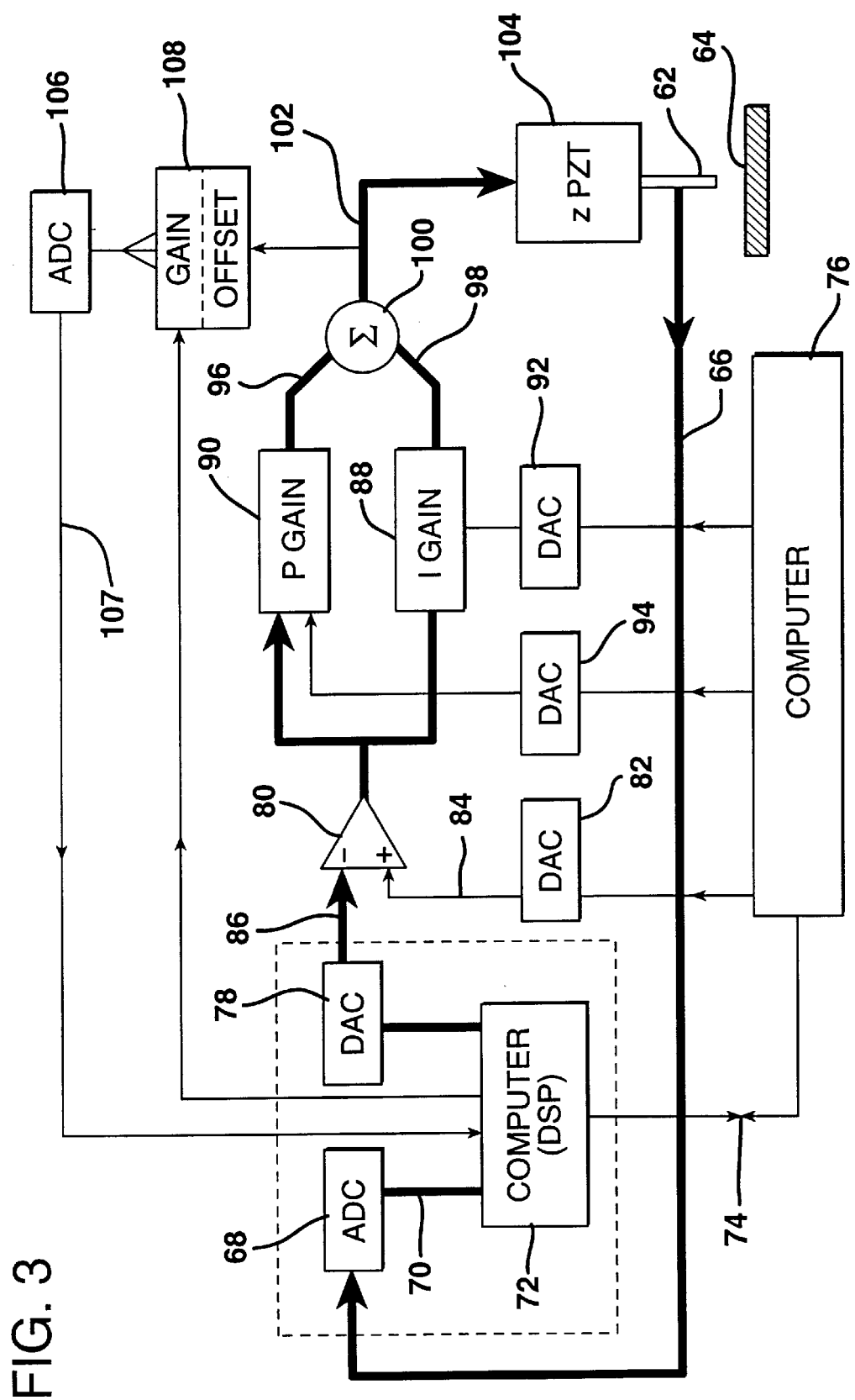
FIG. 3 is a schematic diagram of a scanning probe microscope controller according to the present invention.

A schematic diagram of the controller for a scanning probe microscope according to a presently preferred embodiment of the present invention is shown in FIG. 3. The signal from a tip 62 interacting with a sample surface 64 is fed on line 66 to an analog to digital converter (ADC) 68 where it is converted into a binary data stream on line 70. This data stream is read by a dedicated processor 72 which, according to a preferred embodiment, is a digital signal processing (DSP) integrated circuit housed in the microscope controller. The instructions controlling the operation of processor 72 are sent via an interface 74 from the computer 76 that controls the overall operation of the scanning probe microscope system and displays the images obtained by it. (Some microprocessor integrated circuits, such as the Z-8 series from Zilog, include variants which include both a traditional microprocessor and a DSP on the same chip. Such a device could also be used here to accomplish the functions of processor 72 and computer 76). Thus, for example, if computer 76 is set to carry out an STM operation, instructions are downloaded to processor 72 which make it take the logarithm of the incoming signal. The signal is converted back to analog form by digital to analog converter (DAC) 78. An error signal is generated by the differential amplifier 80, to which the setpoint signal is applied by computer 76 using the digital to analog converter (DAC) 82. This signal appears on line 84. The other input to differential amplifier 80 is the signal from DAC 78 on line 86. The gain of an integrator 88 and a proportional amplifier 90 are set by digital to analog converters (DACs) 92 and 94, respectively, and these, in turn, are controlled by the computer 76. The outputs of the proportional (96) and integral (98) gain elements are summed in a summing junction 100 and the resulting signal on line 102 is used to control the height of tip 62 by means of transducer 104. The signal to this transducer is a measure of the height of the sample surface and it is digitized by the analog to digital converter (ADC) 106 after passing through a variable gain and offset stage 108 which is under the control of the dedicated processor 72.

The variable gain and offset stage 108 works in the following manner. The first line of data is acquired with the gain and offset (voltage out for zero volts in) of the analog to digital converter 106 set at their maximum values (i.e., the gain is set at the value corresponding to the maximum movement of the height transducer 104 and the offset is set to zero). A line-scan of data is then acquired and passed to processor 72 along signal line 107. Processor 72 determines that the mean signal value is M volts and that the fluctuation (i.e., range) is V volts for the data acquired on that first line-scan. This data is the final height signal (data on line 102) as opposed to the control input (current or displacement) on line 66. The processor 72 then adjusts the gain (i.e., the range over which the signal is digitized) and offset (i.e., average value of the signal) for the gain/offset stage circuitry 108 so that the full range (e.g., 16 bits) of analog to digital converter 106 is used for the conversion. Thus, if the mean level of signal is +2.5V and the fluctuation, V, is ±1.5V, then the gain/offset circuitry is adjusted so that the mean (0.5×16 bits) level of the 16 bit analog to digital converter is set to +2.5V and the full range of the analog to digital converter covers 1V to 4V. This is realized by, for example, controlling the gain of an operational amplifier with a digital to analog converter chip and summing an offset in the same operational amplifier.

Additional circuitry may be interposed between summing junction 100 and transducer 104 as might be required by a particular transducer, such as high voltage driver circuitry and the like. Such circuits are well known to those of ordinary skill in the art and are not set forth here to avoid overcomplicating the disclosure.

Figure 5:
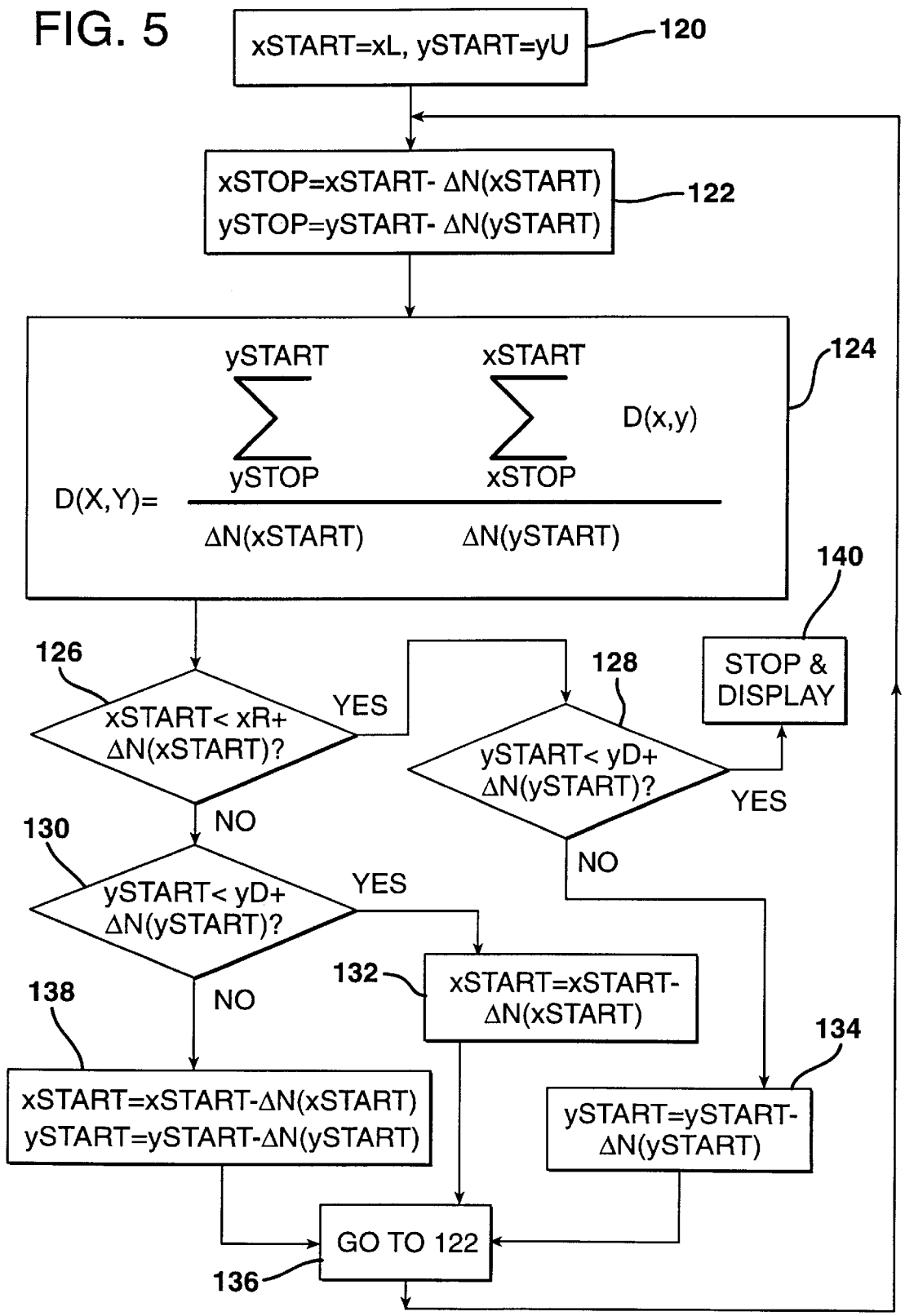
FIG. 5 is a flow chart showing a process for producing a linearized display from the non-linear data obtained with a non-linear scan.

At the start of a scan, the variable gain/offset element 108 is set to minimum gain and the offset applied to it is set to zero. After the end of one line scan, the data corresponding to the height of the sample along the first line of scanning is stored in a buffer in the dedicated processor 72 after being digitized by the analog to digital converter 106. The mean and variance of the line is calculated by the processor 72. The gain of the variable gain element 108 is then set so as to be proportional to the inverse of the calculated variance. The constant of proportionality is chosen such that the smallest gain just encompasses the full range of the required height-transducer voltage within the window over which the analog to digital converter (ADC) 106 operates. The calculation is then repeated in order to map the set of acquired lines onto a set of displayed lines so that the display shows data which is linear in displacement. The overall procedure is illustrated in FIG. 5 which is a flow-chart of this procedure and is described below.

The mean of the line stored after the line scan is used to set the offset into the variable gain stage 108, so that the mean operating point of the analog to digital converter (ADC) 106 is always around zero. The gain of variable gain stage 108 is left at these levels for subsequent line scans. It is reset whenever the microscope's field of scan is altered.

Figure 4A:
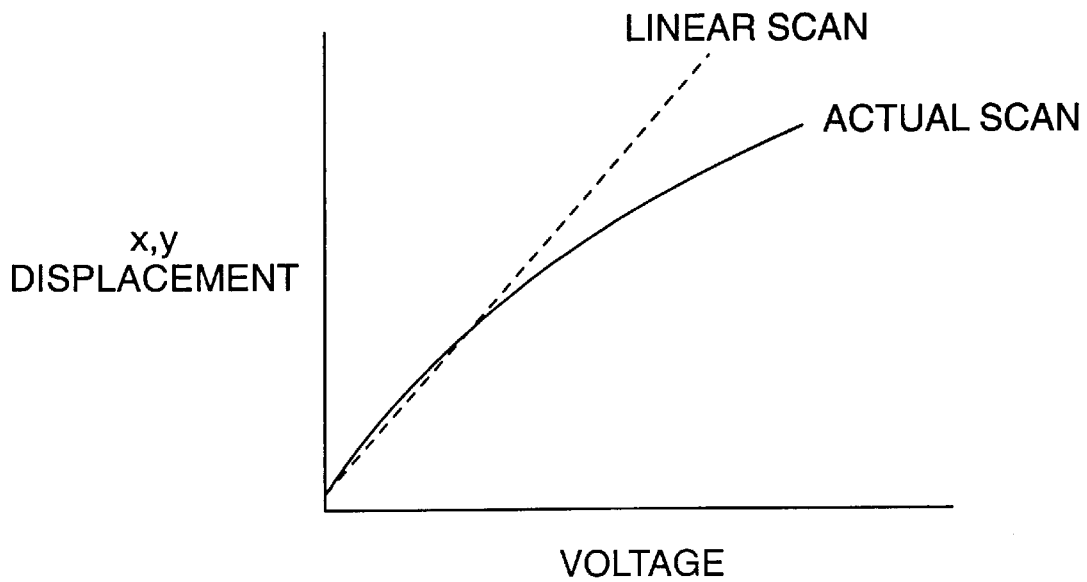
FIG. 4A is a diagram illustrating the non-linearity in the scanning transducers.

Because of the non-linear response of the piezoelectric scanning elements, the scan is distorted as illustrated in FIG. 4A. Near the center of the scan (no voltage applied to the scanning element) the displacement changes linearly with applied voltage. The scanning transducer is usually fabricated so that two orthogonal directions of scan, x and y may be applied simultaneously, and the displacement as a function of $|x|$ or $|y|$ or has the form shown in FIG. 4A, with transducers being less sensitive at larger applied voltages. In what follows, the intended position (i.e., the position corresponding linearly to the voltage applied) is x,y. The actual physical displacement is x',y' and the coordinates on a linearized display are X,Y.

Figure 4B:
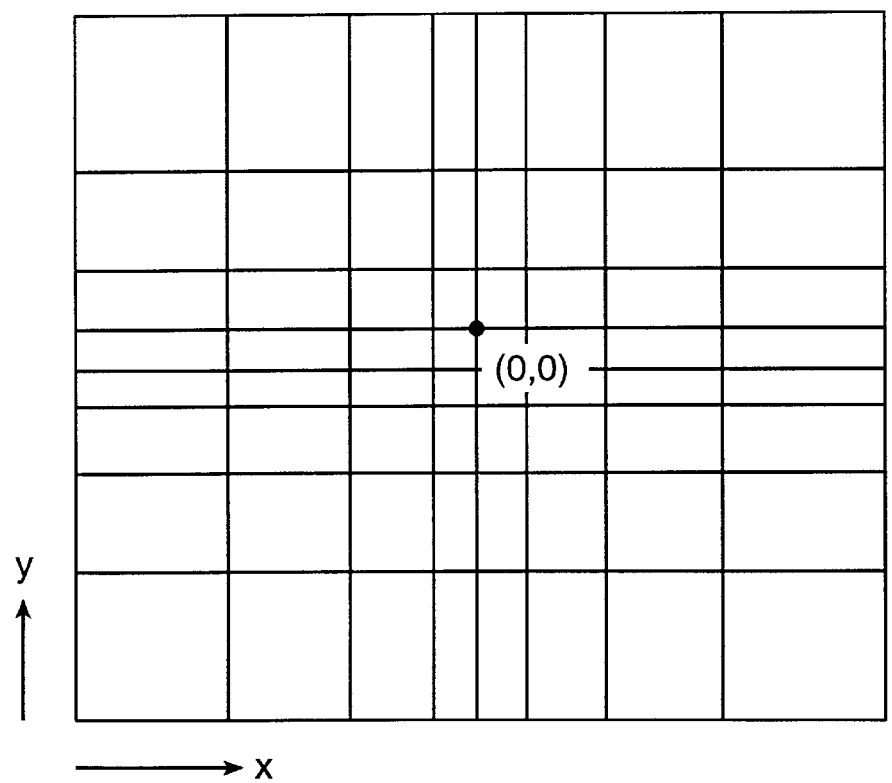
FIG. 4B is a diagram showing the effects of a non-linear scan, and how the display of a scan of regularly spaced lines appears distorted.

If a calibration object consisting of an array of equally spaced orthogonal lines in the x and y directions is scanned, an image, prior to linearization, has the general appearance shown in FIG. 4B. The spacing of the lines in the image increases with distance away from the center of the scan, which is here assumed to be at x=0, y=0. If the calibration object has lines at known intervals (such as a microfabricated two-dimensional diffraction grating), then the display on the screen can be fitted to the known position of the lines (x',y') by the following polynomials to a high degree of accuracy:

$$x'=ax+bx^2+c|x|^3$$

$$y'=dy+ey^2+f|x|^3$$

Here, a, b, c, d, e and f can be determined by scanning a test object as described above and using a non-linear least squares fit to match the measured dimensions to the dimensions on the image. This is a standard procedure for calibrating scanning-probe microscopes. At any point x,y on the generated scan, the fraction by which the image appears to be stretched out is easily determined from the foregoing equations as:

$$x\text{fac}=(b/a)|x|+(c/a)x^2$$

$$y\text{fac}=(e/d)|x|+(f/d)y^2$$

where xfac is the fraction by which the image appears extended in the x direction and yfac is the factor by which the image appears extended in the y direction.

Figure 4C:
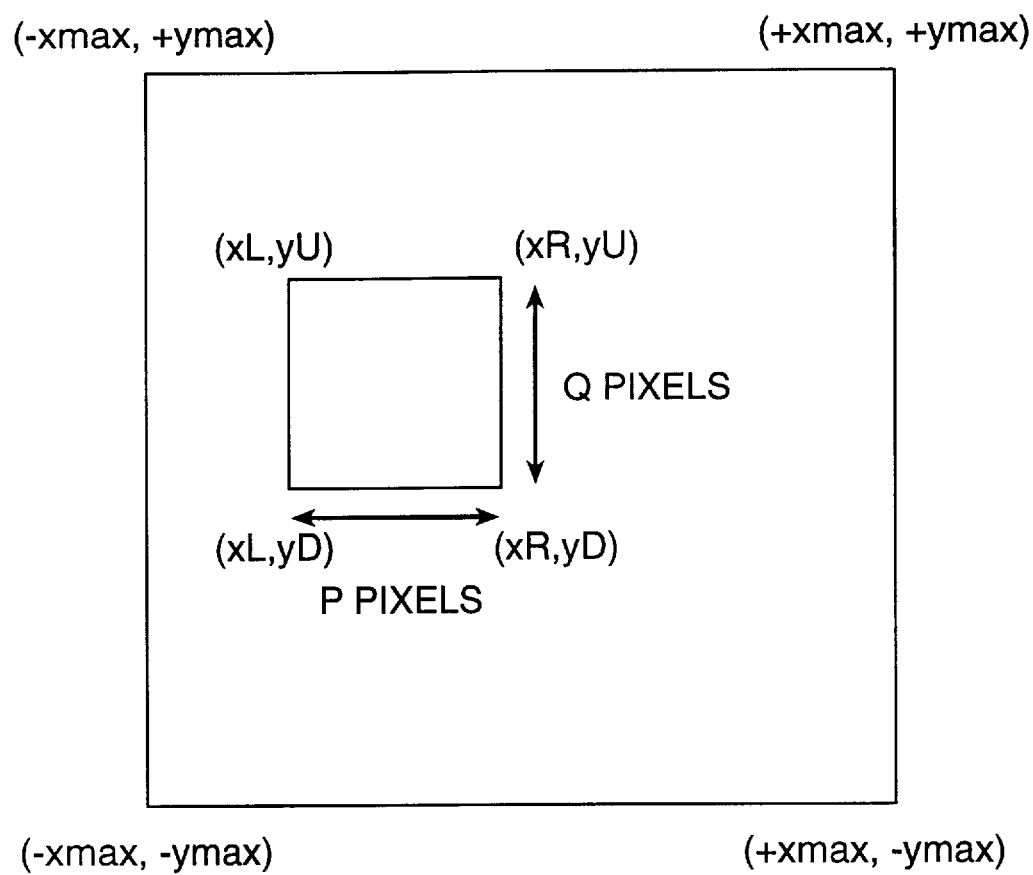
FIG. 4C is a diagram showing the scan coordinates used in the calculations used in a preferred embodiment of the present invention.

In operation, the microscope is usually not scanned symmetrically about the center of the scan (x=0, y=0). The scan takes place in a rectangle with coordinates (xL, yU), (xR, yU), (xL, yD) and (xR, yD) within the allowed maximum (−xmax, ymax), (xmax, ymax), (−xmax, −ymax), (xmax, −ymax) as illustrated in FIG. 4C.

According to a presently preferred embodiment of the present invention, coefficients a, b, c, d, e and f are first determined by scanning a test object as discussed above and storing the coefficients for further use as described below into the memory of the computer that controls the microscope. Now, according to the invention, at the time that the operator sets the machine to scan the rectangle illustrated in FIG. 4C with a resolution of P pixels in the x direction and Q pixels in the y direction, a look-up table of P elements, and Q elements is generated according to the following:

$$\Delta N(x)=1+\text{INT}(x\text{fac}*P)$$

$$\Delta N(y)=1+\text{INT}(y\text{fac}*Q)$$

Figure 4D:
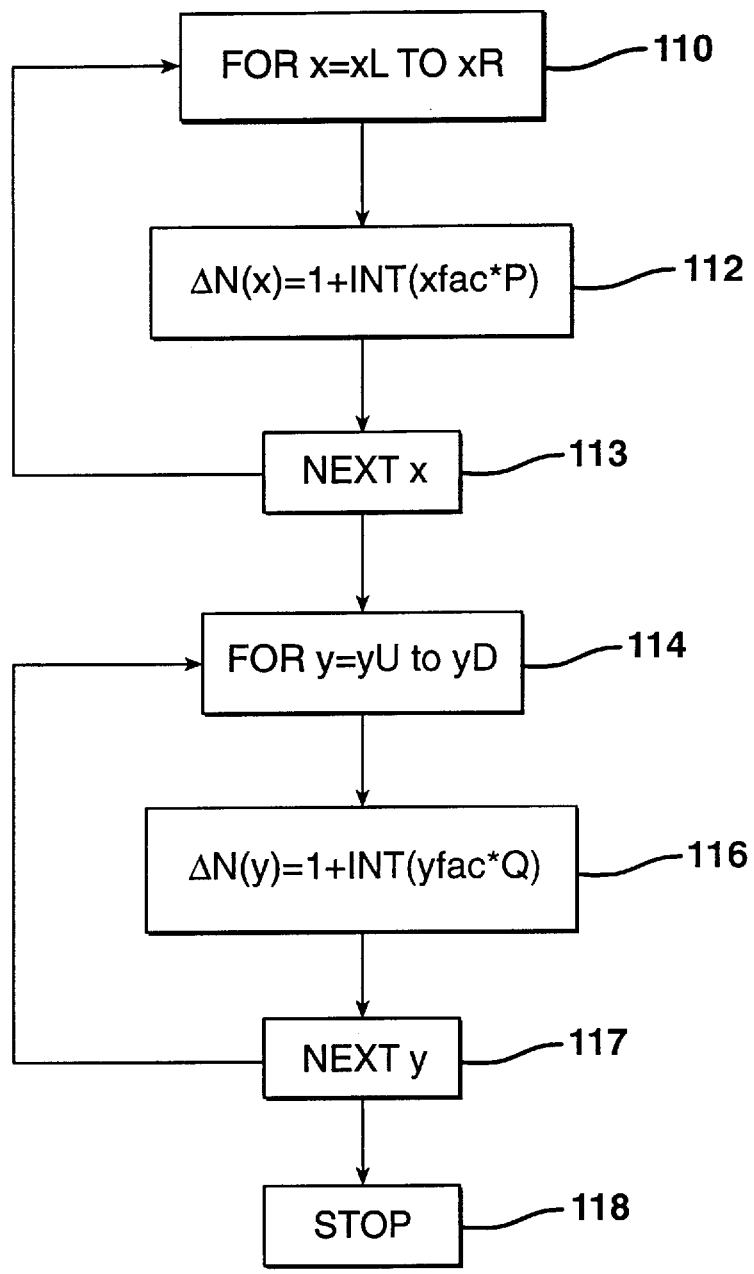
FIG. 4D is a flow chart showing a process for determining correction parameters used to correct for non-linearities caused by the scanner.

Here, INT means "take the integer value of". The process is illustrated in the flow chart set forth at FIG. 4D. The instrument is scanned, and the image is acquired as an array D(x,y). Before the data is displayed in the screen, it is passed into another array D(X,Y) according to the following:

$$D(X,Y) = \frac{\sum_{y\text{stop}}^{y\text{start}} \sum_{x\text{stop}}^{x\text{start}} D(x,y)}{\Delta N(x\text{start}) \times \Delta N(y\text{start})}$$

where initially, xstart and ystart are set equal to xL and yU and then decremented down to xR and yD according to the flow chart shown in FIG. 5. Upon completion of the calculation of D(X,Y) the data is written onto the screen (block 140 in FIG. 5). In another embodiment, the data is written to the display screen after each line (e.g., one complete calculation of X data for lines of y data) is written, giving an essentially instantaneous appearance of linearized data.

Figure 6A:
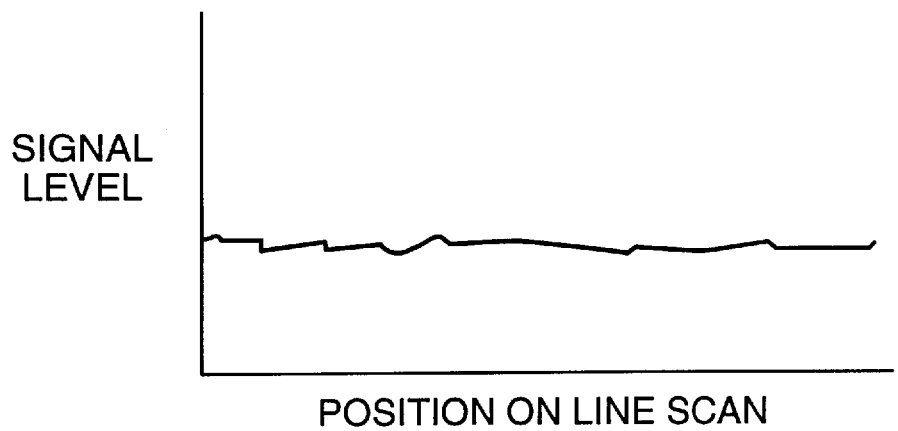
FIG. 6A is a diagram illustrating the tip-sensor signal for correct operation of the servo controller—there is no variation in the signal as a line is scanned.
Figure 6B:
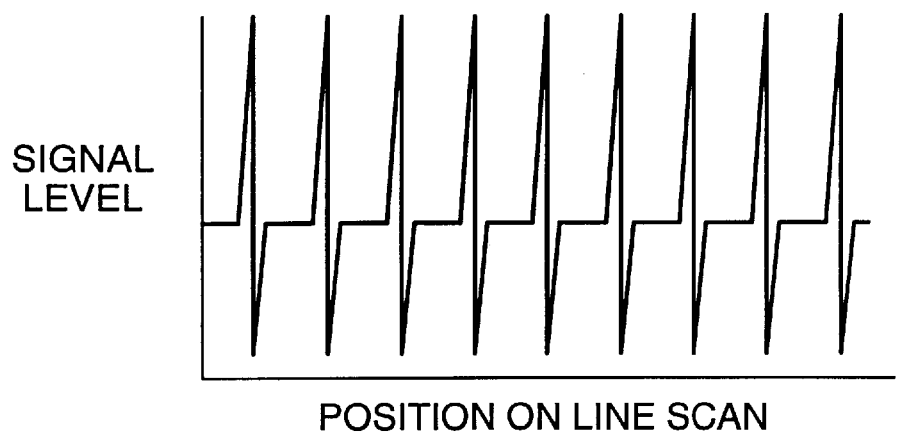
FIG. 6B is a diagram illustrating the tip-sensor signal characteristic of too high a servo-gain.
Figure 6C:
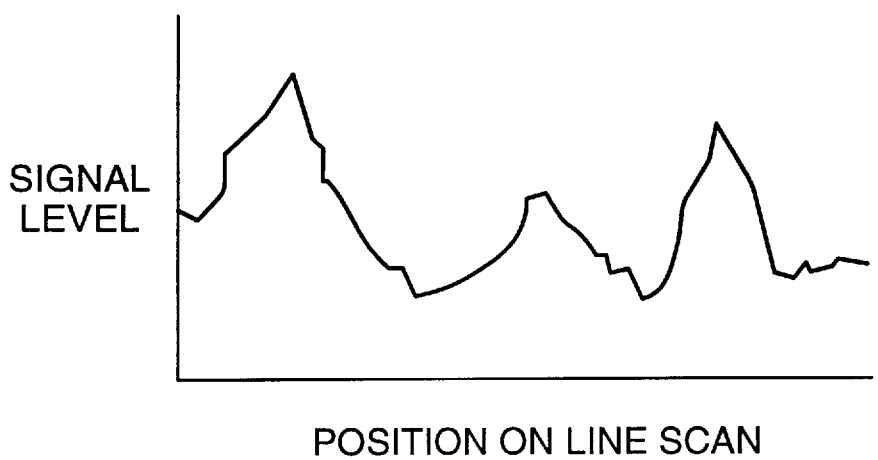
FIG. 6C is a diagram illustrating the tip-sensor signal characteristic of too low a servo gain.
Figure 6D:
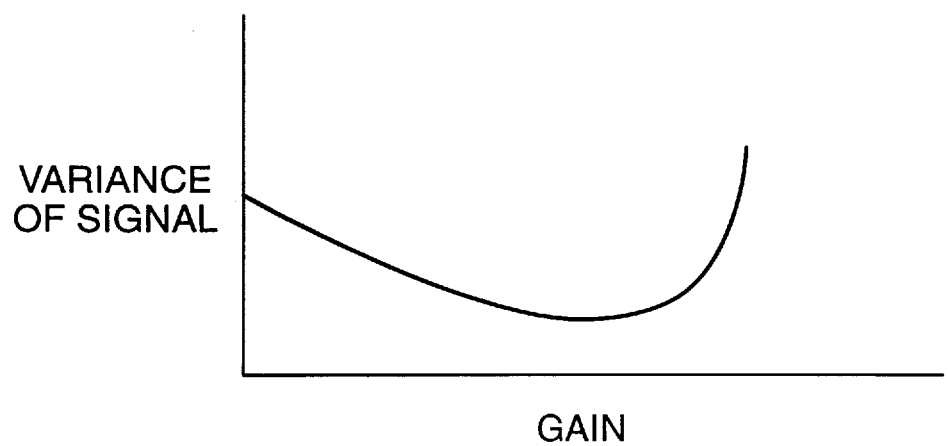
FIG. 6D is a diagram illustrating a plot of the variance in signal from the tip-sensor as a function of the servo gain.

Automatic adjustment of the overall servo gain is achieved in the following way: a line of data is recorded for the input signal and stored in a buffer in the dedicated processor 72 of FIG. 3. When the servo is operating properly, this signal will be constant over the line-scan, as illustrated in FIG. 6A. When the gain is too high, this signal will show oscillations, usually at a high frequency, as illustrated in FIG. 6B. The onset is rapid above a critical value of gain. When the gain is too low, the signal varies with topography across the surface, as illustrated in FIG. 6C. Thus, a plot of the variance of this signal versus gain has the form shown in FIG. 6D. In region 1 of FIG. 6D, the gain is too low and the signal is changing with sample topography. In region 2 of FIG. 6D, the gain is too high and the rapid onset of oscillation gives rise to a rapid rise in variance. In operation, the variance of this signal is recorded from line-to-line as the gain is gradually increased. Once a rapid rise is detected, the gain is then reduced to a level just below the value that gave the rapid rise. The gain is then adjusted upwards by a small amount on one line scan and downwards on the next. The difference in variance between the gain-up and gain-down scans is then used to calculate a correction to the gain, chosen so as to drive the system towards the minimum variance of this signal.

For example, if the gain of the servo loop is set at 10 and the variance in the current (or displacement) signal is 2.1 and the gain is changed to 20 and the variance in the current (or displacement) signal is then 2.3, then the gain must be reduced by some (appropriately chosen) constant times 2.3–2.1. In this way, gain control operates to set the gain so that variance in the quantity that should be constant (i.e., current or displacement) is minimized.

While illustrative embodiments and applications of this invention have been shown and described, it would be apparent to those skilled in the art that many more modifications than have been mentioned above are possible without departing from the inventive concepts set forth herein.

The invention, therefore, is not to be limited except in the spirit of the appended claims.

What is claimed is:

1. A controller for a scanning probe microscope having: (1) a sensor probe tip which is used to generate an analog height signal indicative of the distance between said sensor probe tip and a sample surface under investigation, and (2) a height transducer coupled to said sensor probe for controlling said distance between said sensor probe tip and a sample surface under investigation, said controller comprising:

a computer for controlling programmable elements of the controller;

an analog to digital converter having as its input the analog height signal and as its output a digital height signal;

a programmable digital signal processor under control of said computer for carrying out selected signal processing operations on said digital height signal to form a processed digital height signal;

a digital to analog converter having as its input said processed digital height signal and as its output a processed analog height signal;

means for inputting an analog set point signal indicating a desired distance between the sensor probe tip and the sample surface under investigation;

means for generating an error signal proportional to a difference between said analog set point signal and said processed analog height signal;

means for integrating said error signal to form an integrated error signal;

means for adding said integrated error signal to a signal proportional to said error signal to form a transducer control signal;

means for applying said transducer control signal to the height transducer to control the distance between said sensor probe tip and a sample surface under investigation;

means for applying a gain and an offset to said transducer signal to form an adjusted transducer signal, said means for applying operating under control of said programmable digital signal processor;

means for digitizing said adjusted transducer signal to form a digitized adjusted transducer signal; and means for applying said digitized adjusted transducer signal to said programmable digital signal processor.

2. A controller for a scanning probe microscope having: (1) a sensor probe tip which is used to generate an analog height signal indicative of the distance between said sensor probe tip and a sample surface under investigation, and (2) a height transducer coupled to said sensor probe for controlling said distance between said sensor probe tip and a sample surface under investigation, said controller comprising:

a computer for controlling programmable elements of the controller;

an analog to digital converter having as its input the analog height signal and as its output a digital height signal;

a programmable digital signal processor under control of said computer for carrying out selected signal processing operations on said digital height signal to form a processed digital height signal;

a digital to analog converter having as its input said processed digital height signal and as its output a processed analog height signal;

means for inputting an analog set point signal indicating a desired distance between the sensor probe tip and the sample surface under investigation;

means for generating an error signal proportional to a difference between said analog set point signal and said processed analog height signal;

means for integrating said error signal to form an integrated error signal;

means for adding said integrated error signal to a signal proportional to said error signal to form a transducer control signal;

means for applying said transducer control signal to the height transducer to control the distance between said sensor probe tip and a sample surface under investigation, means for applying a gain and an offset to said transducer signal to form an adjusted transducer signal, said means for applying operating under control of said programmable digital signal processor;

means for digitizing said adjusted transducer signal to form a digitized adjusted transducer signal;

means for applying said digitized adjusted transducer signal to said programmable digital signal processor, a mean line value determined by averaging a plurality of values for said digitized adjusted transducer signal taken at a plurality of positions along a line under scan;

a variance line value determined by comparing a plurality of values for said digitized adjusted transducer signal taken at a plurality of positions along a line under scan;

an inverse of said variance line value is determined;

said gain is set so as to be proportional to said inverse of said variance; and said offset is set so that the mean line value is digitized at the zero of said digitizing means.

3. In a method of operating a scanning probe microscope having a scanning probe, a sample stage for supporting a sample surface to be scanned and a nonlinear piezoelectric scanner having an attached end and a free end to produce a relative cyclic lateral scanning motion between the scanning probe and the sample stage in response to the application of a cyclically changing scan voltage to electrodes carried by the piezoelectric scanner, the improvement by which data recovered by the scanning probe in scanning the sample surface is made linear with space, said method comprising the steps of:

causing the cyclically changing scan voltage applied to the piezoelectric scanner electrodes to change in voltage linearly with time over a substantial portion of each voltage cycle;

scanning a test object having markings of known spacings located thereon and detectable by the scanning probe microscope;

obtaining information which relates the operation of the nonlinear piezoelectric scanner to a linear space; and converting spatially non-linear data obtained by scanning the sample surface to spatially linear data by converting said spatially non-linear data as a function of the distance from the center of the scan.

4. A method according to claim 3 further comprising:
displaying said spatially linear data.

5. A method according to claim 3 further comprising:
displaying said spatially linear data in line-by line fashion as it is converted.

6. A method for correcting non-linearities in a scanning transducer of a scanning probe microscope driven by application of a cyclically changing scan voltage applied to electrodes of said scanning transducer wherein raw data, obtained at points that are not equally separated in space, are converted into a data set in which elements of said data set correspond to points equally separated in space, said method comprising the steps of:

causing the cyclically changing scan voltage applied to the electrodes of the scanning transducer to change in voltage linearly with time over a substantial portion of each voltage cycle;

scanning a test object having markings of known spacings located thereon and detectable by the scanning probe microscope;

obtaining polynomial coefficients for a set of equations which translate points in the raw data of the scan of the test object to equally separated points in a linear space;

based upon said polynomial coefficients, determining, for each direction of the scan to be mapped into the data set, an integer factor by which each point in the raw data is to be mapped into the data set; and for each point in the data set, calculating the value of the point in the data set based upon inputs including a plurality of elements of the raw data and a plurality of said integer factors.

7. A method according to claim 6 further comprising:
displaying said spatially linear data.

8. A method according to claim 6 further comprising:
displaying said spatially linear data in line-by line fashion as it is converted.

9. A method of automatic adjustment of the overall servo gain of a scanning probe microscope having: (1) a sensor probe tip which is used to generate an analog height signal indicative of the distance between said sensor probe tip and a sample surface under investigation, and (2) a height transducer coupled to said sensor probe tip for controlling said distance between said sensor probe tip and a sample surface under investigation, said method comprising:

operating the microscope to obtain a line of data corresponding to a path scanned across the sample surface by the sensor probe tip;

analyzing the line of data to determine the existence of one of at least three conditions in said line of data, said three conditions including:

Condition 1: relatively constant signal across the line scan;

Condition 2: oscillations present in signal across the line scan; and

Condition 3: signal varies with topography across the line scan; and employing a digital signal processor to automatically alter the servo gain of said scanning probe microscope such that on Condition 1, the gain is kept constant, on Condition 2, the overall servo gain is reduced, and on Condition 3, the overall servo gain is increased.

10. A method of operating a scanning probe microscope as claimed in claim 7 further including as a first step calculating the parameters required to transform the points in said spatially non-linear data to spatially linear form prior to the start of a scan over a chosen area.

11. In a method of operating a scanning probe microscope having a scanning probe, a sample stage for supporting a sample surface to be scanned and a nonlinear piezoelectric scanner having an attached end and a free end to produce a relative cyclic lateral scanning motion between the scanning probe and the sample stage in response to the application of a cyclically changing scan voltage to electrodes carried by the piezoelectric scanner, the improvement by which data recovered by the scanning probe in scanning the sample surface is made linear with space, said method comprising the steps of:

calculating the parameters required to transform the points in said spatially non-linear data to spatially linear form prior to the start of a scan over a chosen area;

causing the cyclically changing scan voltage applied to the piezoelectric scanner electrodes to change in voltage linearly with time over a substantial portion of each voltage cycle:

scanning a test object having markings of known spacings located thereon and detectable by the scanning probe microscope;

obtaining information which relates the operation of the nonlinear piezoelectric scanner to a linear space; and converting spatially non-linear data obtained by scanning the sample surface to spatially linear data.

* * * * *